United States Patent Office 3,023,238
Patented Feb. 27, 1962

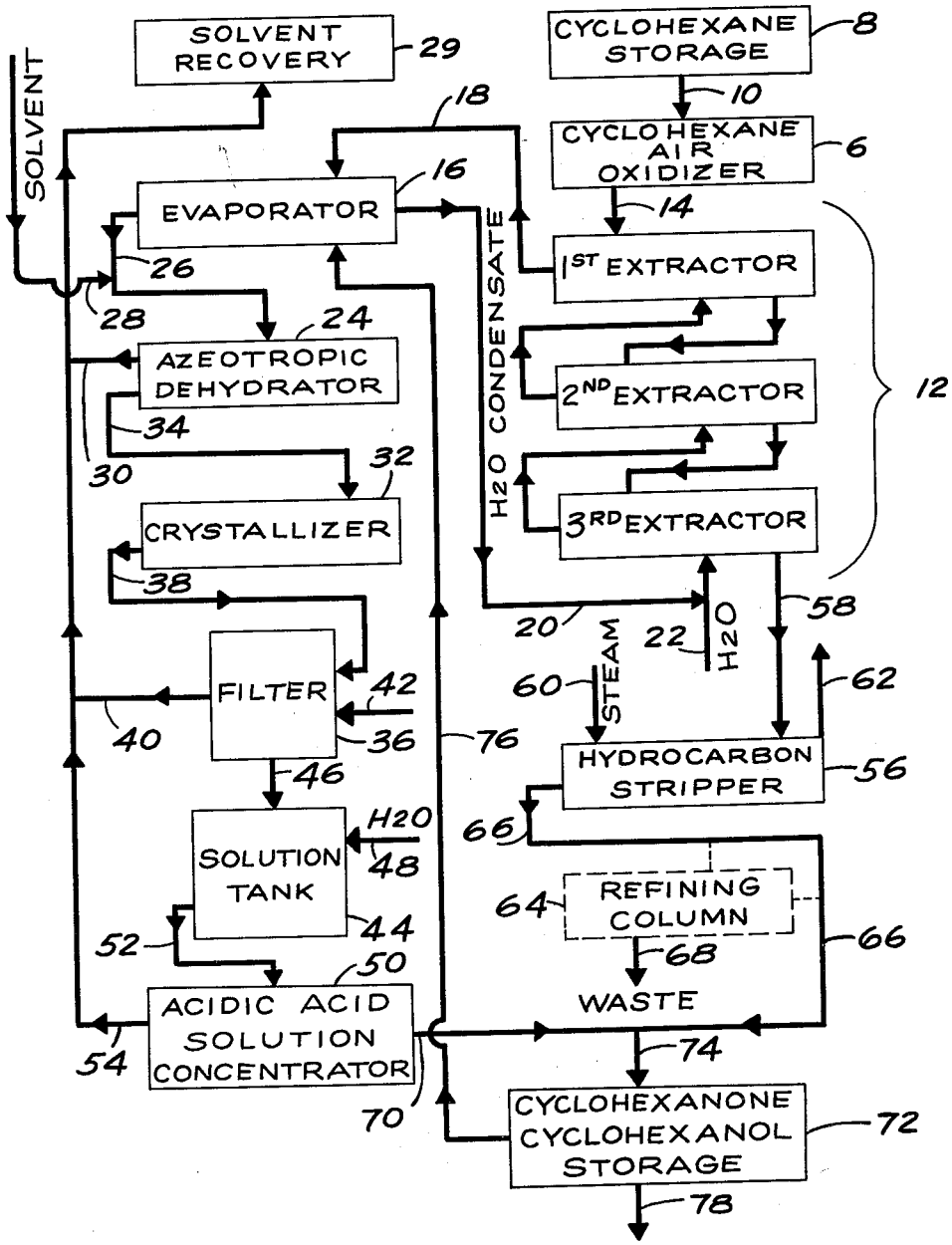

3,023,238
PROCESS FOR RECOVERING ADIPIC ACID FROM THE REACTION PRODUCTS OF THE AIR-OXIDATION OF CYCLOHEXANE
Richard D. Chapman, Charles R. Campbell, and Robert Johnson, Pensacola, Fla., assignors to the Chemstrand Corporation, Decatur, Ala., a corporation of Delaware
Filed Sept. 8, 1959, Ser. No. 838,629
7 Claims. (Cl. 260—533)

This invention relates to the production of adipic acid and especially to improvements in multi-stage processes for producing adipic acid. Stated in another way, the invention is concerned with the conservation or recovery of adipic acid in processes wherein, in the course of steps thereof, adipic acid already formed is removed along with undesirable materials and thereby is lost to the ultimate yield of the process.

A common and commercial method of producing adipic acid involves a series of steps including (1) the oxidation of cyclohexane with air leading to the production of an intermediate reaction product, (2) the removal of unwanted materials from the intermediate, and (3) final oxidation of the intermediate material with a strong oxidizing agent, such as nitric acid. The intermediate product after the unreacted cyclohexane has been removed such as by a hydrocarbon stripping operation is composed mainly of cyclohexanol and cyclohexanone; however, there may be, and usually is, present an important amount of adipic acid, e.g., ten percent or more, and a significant amount of adipic acid potential in the form of esters. Admixed with this desirable material are various undesirable impurities which are commonly and preferably removed prior to the final nitric acid oxidation stage. Usually this is accomplished by a steam stripping step such as normally is performed in a refining column. Unfortunately, this step also removes most of the adipic acid present in the intermediate product and such acid is lost from the process, since the removed material ordinarily is burned as a waste product. Obviously, this reduces considerably the economic attractiveness of the process. Thus, it is of importance from an economic viewpoint that this loss of adipic acid be eliminated or minimized to the fullest extent possible. Because of the complexity of the intermediate product, to accomplish this involves considerable difficulty, especially since the cost of the recovery technique must be below the worth of the recovered adipic acid. By this invention, the problem is overcome; and, at the same time, other advantages accrue in the process leading to reduced cost and eliminating other difficulties therein.

It is, therefore, an object of this invention to provide a process for the manufacture of adipic acid wherein adipic acid produced in the process and present at a point early in the process, either as such or as both acid and ester form is conserved or recovered during processing through intermediate steps.

It is also an object of this invention to provide a method for the removal and recovery of adipic acid and adipic acid esters in the form of adipic acid contained in the reaction product of the oxidation of cyclohexane into primarily cyclohexanone and cyclohexanol with a gas containing molecular oxygen.

A still further object of the invention is to provide an adipic acid manufacturing process in which the steam stripping step heretofore employed in removing undesirable material from the intermediate product described above is unnecessary.

Another object of the invention is to provide a method for improving the quality of such intermediate product which may then be further oxidized.

A further object of the invention is to provide a method wherein the efficiency of the overall process of producing adipic acid as generally described above and the yield of adipic acid are increased.

A still further object is to provide an adipic acid manufacturing process which is easily controlled and has attractive economic aspects.

It is desirable to present a general discussion of the several operations of the new process of the instant invention, leading to the advantages herein described before considering the details which are involved.

Generally stated, and having in mind the objective of conserving adipic acid present in the above-described intermediate product, the invention has to do with a procedure involving essentially five main steps. These are as follows: (1) aqueous extraction under hydrolytic conditions of the intermediate product resulting from the well-known air-oxidation of cyclohexane to obtain a mixture of cyclohexanone and cyclohexanol before the unreacted cyclohexane is removed therefrom; (2) evaporation of the aqueous extract thereby to reduce the water content thereof to a low percentage; (3) the addition of an organic solvent of the type forming a low boiling azeotrope with water to the evaporated extract; (4) the subsequent azeotropic distillation of the resulting mixture to reduce the water content to approximately one percent by weight of the mass; and (5) the adjustment of the temperature of the solubilized residue of the azeotropic distillation whereby selective precipitation of adipic acid in crystalline form is effected. The recovered adipic acid is then combined with the raffinate of the aqueous extraction step at an appropriate stage, if desired.

The first of the five mentioned steps, namely, the aqueous extraction step of the intermediate product obtained by the air-oxidation of cyclohexane before the unreacted cyclohexane is removed therefrom, results in the production of a two-layer or two-phase system, the lower layer being the aqueous phase and containing the extracted material and the upper phase containing unreacted cyclohexane and oxidation products. For this purpose, the upper layer is decanted or continuously withdrawn and its processing may continue concurrently with the treatment of the aqueous phase.

At this point, it is desired to point out a very significant and important additional advantage accruing according to this invention in connection with the decanted upper phase. By carrying out the aqueous extraction step with care and in accordance with the teaching herein, it is no longer necessary to steam-distill the intermediate product after the unoxidized cyclohexane has been removed therefrom. It is found that, by following the teaching herein, the intermediate product is rendered sufficiently free of undesirable materials that it may be transferred without additional treatment to the nitric acid oxidation stage.

It will be understood that this invention contemplates the employment of conditions at the various steps which are conducive to the conservation of the greatest amount of adipic acid, operations under the least difficulty in such conservation, and operations under the lowest possible cost conditions. For these purposes the best known conditions are set forth hereinafter; however, it is to be understood that within the invention many modifications may be practiced.

Referring in greater detail to the conditions to be employed in effecting the aqueous extraction of the first step of the new process, the intermediate product is subjected to conditions not only calculated to remove substantially all of the adipic acid and other unwanted materials from the intermediate product, but also under conditions leading to the hydrolysis of adipic acid esters formed during the course of the initial oxidation. As stated above, it has been discovered that such adipic acid esters are present in the intermediate product in significant amounts, and that unless such esters are hydrolized and maintained in an unesterified condition throughout the succeeding steps herein described, in adipic acid in esterified form will not be recovered efficiently since such esters are not precipitated along with the adipic acid in the later precipitation or crystallization step. While the extraction of adipic acid and other water-soluble material may be accomplished at temperatures in the range of about 30 to about 200° C., it is found that the objective of substantially complete purification of the intermediate product and the substantially complete hydrolysis of the esterified adipic acid is best accomplished when at least the initial engagement of water with the product is at a temperature within the range of about 120° C. to about 165° C. and under the concomitant pressures in a closed system. These conditions of temperature and pressures fortunately coincide with that under which the intermediate product is produced; and, therefore, adjustments thereof are not required. Desirably, though not necessary, the aqueous extraction step involves the employment of a multi-stage countercourrent continuous extraction technique, at least two stages being suggested, usually four stages being adequate but more than four stages being envisioned by the invention wherever significant improvement can be effected thereby. As just stated, the first stage of the multi-stage extraction operation preferably is carried out at a temperature within the range of about 120° C. to about 165° C. However, succeeding stages in the extraction operation preferably are carried out at lower temperatures, although they may be carried out in the same temperature range with possible loss of efficiency in the process. Preferably, the temperature in the succeeding extraction stages is not allowed to drop below about 40° C., since lower temperatures are not favorable to complete extraction of adipic acid.

In order to minimize the volume of the mass of material to be treated, it is desirable to employ the smallest effective amount of water consistent with the objects sought to be accomplished. Obviously, within limits, the more water that is employed the greater is the extent of removal of material from the intermediate product. Thus, at least sufficient water should be used to effect solubility of adipic acid present and the adipic acid formed by hydrolysis in the extraction step. The resulting aqueous extract containing the adipic acid is separated from the organic phase containing primarily cyclohexane, cyclohexanone and cyclohexanol.

The subsequent or the following evaporation step (step 2 above-mentioned) is straightforward and is carried out under conditions suitable to remove as much water as conveniently possible from the aqueous extract. Suitably, the evaporation is carried out at reduced pressure, for example, in the range of about 100 to about 400 millimeters of mercury, preferably about 200 millimeters, under which pressure efficient evaporation takes place at about 95° C. or lower. These conditions are preferred in order to favor the maintenance of adipic acid in unesterified form, thereby assuring its recovery. It has been found that the hydrolysis is normally reversed at temperatures above about 95° C. Suitably, the water content of the mixture is reduced to about 5 percent by weight or less thereby to facilitate the following azeotropic distillation step. However, it will be appreciated that this is not a critical percentage and it may be varied to some extent.

To the residue of the evaporation step is added a quantity of a suitable organic solvent for the entire mass in accordance with step 3 above mentioned; and the azeotropic distillation is proceeded with immediately to effect further reduction of water. Desirably, the water content of the residue is reduced to a range of 2 to 3 percent, preferably, 1 percent or less; otherwise, crystallization of adipic acid in the succeeding crystallization step is not fully and favorably accomplished since water induces the retention of adipic acid in the mother liquor, this retention being especially undesirable at elevated crystallization temperatures. In carrying out the process of this invention any organic solvent capable of dissolving substantially completely the residue of the evaporation step but unreactive therewith and forming an azeotropic mixture with water such that upon subsequent azeotropic distillation the adipic acid therein is concentrated by the substantial removal of the water therefrom may be used. Obviously, it is necessary that the adipic acid not be soluble in the solvent at the crystallization temperature employed. Of such organic solvents that can be used include 2-nitropropane, 1-nitropropane, nitroethane, nitromethane, chloroform, carbon tetrachloride, etc. or suitable mixtures thereof. The amount of organic solvent which must be employed is not critical and can be varied considerably; however, a minimum but effective amount consistent with the purpose of the use of the solvent is required.

Azeotropic distillation of the residue may proceed at pressures within the range of about 100 millimeters to about 760 millimeters pressure of mercury. Here again, however, it is desirable to observe conditions leading to the prevention of the formation of adipic acid esters including the mono- and di-esters. Accordingly, at lower pressures, it is apparent that one may use lower temperatures in the operation, which preferably are well below 100° C.

In the fifth step of the series, namely, the adipic acid crystallization step, the remaining solvent mixture of residue is cooled to a temperature where adipic acid crystallizes in economical and recoverable amounts. The range of about 25–40° C. is preferred. This is a straightforward operation taking place without difficulty within a relatively short period of time. Thereafter, the adipic acid is filtered from the liquor and washed.

In understaking to practice the invention herein described, the initial operation is the oxidation of cyclohexane with air. In general, this involves a liquid phase oxidation technique wherein air is introduced into a tower, tubular reactor, autoclave or the like. Usually the autoclave is preferred and is equipped with a stirrer and reflux condenser for water take-off. A feed ratio of reactants calculated to produce a selected percentage of cyclohexane conversion into cyclohexanol and cyclohexanone is employed. As is well known, the degree of conversion may vary as between similar but specifically different processes, depending upon the exact nature of the oxidation products sought to be obtained. The reaction ordinarily is carried out under a pressure of about 50 to 250 pounds per square inch and at temperatures in the range of about 50° to 175° C., usually about 150° C. which temperature is preferred. Although the use of a catalyst is not essential, usually one known in the art is employed, hydrocarbon-soluble compounds of certain metals such as manganese, chromium, vanadium, cerium, cooper, cobalt, etc. being especially suitable. The hydrocarbon-soluble compounds of cobalt, however, such as cobalt naphthenate, give the best results.

As regards this invention, the particular conditions used in the initial oxidation involving the air oxidation of cyclohexane may be varied, since the present invention is concerned primarily with the removal and recovery of adipic acid resulting in relatively small amounts from the air oxidation step. That is to say, the air oxidation conditions may be such that the ratio of cyclohexanone to cyclohexanol, the desired products of the air oxidation step, may be varied considerably.

In order that the invention may be more readily understood, a drawing is appended hereto to which reference now should be made. The drawing is a block-flow diagram illustrating schematically the steps which are involved in the process. Inasmuch as the various pieces of equipment utilized in carrying the invention into effect may be of the conventional type and are well known, they are referred to in general terms with no attempt being made to describe each individual unit or equipment specifically.

With reference to the drawing it is seen that numeral 6 denotes an oxidizer or oxidation zone within which the production of the intermediate is begun. In this zone the air-oxidation of cyclohexane occurs and is carried out in suitable equipment, such as an autoclave having means for stirring and means for removal of the water formed during the oxidation reaction or similar autoclaves arranged to be operated in a continuous fashion. The cyclohexane feed stored in tank 8 and fed to zone 6 via line 10 may be pure or it may be crude petroleum cyclohexane or the like. The temperature maintained in the autoclave is preferably 120° C. to 165° C.; and the pressure therein is maintained at preferably 50 to 250 pounds per square inch, the conditions, of course, being correlated so that the cyclohexane is in a liquid state and will be oxidized with molecular oxygen within a reasonable length of time. In practice the desired quantity of cyclohexane is added to the autoclave and under the just-mentioned conditions is strongly agitated while a gas containing molecular oxygen is introduced into the stirred cyclohexane. Air is preferably the source of molecular oxygen with which to effect the oxidation reaction for obvious economic reasons. However, it will be appreciated that other suitable sources of molecular oxygen may be used. The reaction in zone 6, as above indicated, leads to the production of the intermediate product with which the present invention is especially concerned.

Numeral 12 denotes generally a liquid-liquid extraction unit which may be of any suitable type in which the phases change continuously or in which the change is stagewise; however, preferably, the extraction unit is of the continuous treatment, countercurrent multi-stage type wherein, in each stage the lighter organic phase component of the liquid-liquid extraction system normally is introduced at the bottom of the column apparatus and the heavier aqueous phase component is introduced at the top thereof. Preferably, the apparatus includes a mechanical agitator to insure better extraction. Each stage is interconnected so that the layers which form above and below the points of entry of the two liquids as a result of the mixing and extraction, pass to opposite ends of the succeeding extraction stages, and so forth until the last stage is reached. The construction and operation of such equipment are well known and it is not believed that further discussion thereof is necessary, the objective of the use of the apparatus being to bring the reaction product of the oxidation of cyclohexane into intimate contact with water and to separate the resulting two phases. The extraction apparatus and the oxidizer are interconnected by means of line 14.

Numeral 16 denotes an evaporator which, suitably, may be of the type adapted for operation under a vacuum. The evaporator and extraction apparatus are connected with one another by way of two lines, namely, lines 18 and 20. Line 18 serves to deliver the adipic acid in the aqueous extract, namely, the lower layer in the last stage of the extraction unit 12 to the evaporator 16; and line 20 serves to return the evaporator distillate, namely, water, for use in the extraction unit if desired. Additional or make-up water may be supplied to the extractor by way of line 22 whenever necessary.

Numeral 24 denotes an azeotropic distillation column, or dehydrator, which is adapted to receive the evaporated extract from evaporator 16 by way of line 26. A solvent capable of dissolving said extract and forming an azeotropic mixture with the water contained therein is introduced into the pipeline 26 which is carrying the evaporated extract by way of line 28 whereby the resulting mixture passes into the distillation column 24. Overhead from the distillation column the distillate is delivered to a solvent recovery system 29 by way of line 30.

Number 32 denotes a crystallization chamber or crystallizer which is constructed to receive the adipic acid containing residue from the azeotropic distillation zone by way of line 34 and to cool same so that the adipic acid is precipitated in crystalline form. Number 36 denotes a filter for receiving the cool crystalline mass, together with the mother liquor, from the crystallizer 32 by way of line 38 and for separating the mass from the liquor. Numeral 40 denotes a line for delivering the mother liquor from the filter to a solvent recovery system and numeral 42 denotes a line by which additional washing non-solvent may be applied to the filter cake if desired.

Numeral 44 denotes a solution tank to which the wet filter cake is delivered from the filter 36 by way of line 46 in a conventional manner. Numeral 48 denotes a line employed for the introduction of water into the solution tank. Numeral 50 denotes a distillation column or concentrator to which the adipic acid solution formed in tank 44 is delivered by way of line 52 and wherein the acid is concentrated in a suitable manner such as by evaporation. From this zone, the overhead which is mostly water and some residual solvent is sent to the solvent recovery system by way of line 54.

In the drawing, the flow sheet also indicates an operation leading to the removal of hydrocarbons, primarily cyclohexane, remaining in the organic layer of the last stage of extractor 12. Referring to this portion of the flow sheet, it is noted that numeral 56 represents a hydrocarbon stripper to which the organic layer of the last stage of the extractor is delivered by way of line 58. Numeral 60 denotes a line adapted for the introduction of steam into the hydrocarbon stripper 56, and numeral 62 denotes a line for taking the stripped materials overhead. Since the hydrocarbons stripped are composed primarily of cyclohexane, the same ordinarily will be recycled via line 62 to the cyclohexane storage tank 8. From the stripper 56 the purified cyclohexanol and cyclohexanone-containing mixture may be delivered to a further refining column 64 where the mixture is subjected to distillation conditions for removal of unwanted impurities, although this is not necessary. Numeral 66 denotes the connecting line between the stripper 56 and the column 64. As pointed out above an important advantage of the present invention is the fact that the employment of the refining column normally used and required for quality reasons may be eliminated. Hence, when the extractor 12 is by-passed and the adipic acid is not recovered in accordance with the present invention, it will be perceived that the reaction product of the oxidation of cyclohexane should not only be passed through the hydrocarbon stripper 56 where most of the unreacted cyclohexane is removed but should also be passed through the refining column 64. As indicated, such two steps are necessary to insure a satisfactorily pure product composed essentially of cyclohexanone and cyclohexanol and which is oxidized to adipic acid in a well known manner. In such case the tails are directed to waste by line 68 and the refined product is returned to line 66.

The tails from the operation wherein adipic acid solution is made more concentrated, such operation taking place in column 50, are eventually delivered to cyclohexanone-cyclohexanol storage tank 72. The tails are combined and mixed with the intermediate product comprised primarily of cyclohexanone and cyclohexanol. As illustrated these two materials preferably are combined prior to being delivered to tank 72 and flow together in a common line 74. Due to this solubility characteristics the recovered adipic acid will become substantially completely dissolved in the organic phase. The aqueous layer in tank 72 is decanted and the water is sent to the evaporator by way of line 76. As desired, the organic phase may be directed via line 78 to an oxidizer (not shown) where both the cyclohexanone and cyclohexanol therein are oxidized to adipic acid. It will be appreciated that the adipic acid recovered in accordance with the present invention and which otherwise would be lost from the system increases the overall yield of the adipic acid from the cyclohexane feed material.

To illustrate further the present invention and the advantages thereof, the following specific examples are given, it being understood that these are merely intended to be illustrative and not limitative. Unless otherwise indicated, all parts and percentages are by weight.

*Example I*

From the oxidizer 6 operating at an air to feed ratio of 0.24 and using 98 percent cyclohexane, 1000 gm. of effluent is delivered to the extractor 12 and subjected to three stage countercurrent extraction with 52.4 gm. of water being put in through line 22. The first stage of the extraction is carried out at the temperature of the effluent, about 150° C., and the later two stages each at about 50° C. The organic upper layer of the extraction, 946 gm., is processed in a manner known to those skilled in the art to produce refined cyclohexanone-cyclohexanol; as herein shown, the organic layer is directed through line 58 and then taken through a hydrocarbon stripper 56. From the stripper the refined cyclohexanone and cyclohexanol-containing material is sent to storage where it is recombined with the recovered adipic acid. The stripped hydrocarbons composed primarily of cyclohexane are recovered for obvious economic reasons and the cyclohexane reused. The aqueous extractant lower layer (83.3 gm.) of the final extraction stage and from which the adipic acid is to be recovered is drawn off and delivered to evaporator 16 where about 95 percent of the water is removed along with the steam volatiles, at 200 mm. pressure and 80° C. base temperature. The evaporator overhead (line 20) is recycled to the extractor. The residue weighing 36.8 gm. is mixed with 18.3 gm. of 2-nitropropane supplied from line 28 and led to the dehydrator 24 where the water content is reduced to about 1 percent by azeotropic distillation thereof at 200 mm. and 90° C. column base temperature. The tails from this step weighing 46.4 gm. are fed to the crystallizer 32 where they are cooled to about 40° C. Crystallization of the adipic acid takes place within about five minutes. The resulting crystals of adipic acid are filtered and washed with 57 gm. of 2-nitropropane at room temperature which is introduced into the filter chamber via line 42.

The wet adipic acid cake (7.9 gm.) is put into solution with water which enters at 48 and then sent to a distillation column where residual 2-nitropropane and water are removed. The adipic acid-containing solution which weighs 19.7 gm. is then delivered to the cyclohexanone-cyclohexanol storage tank 72 where it is reunited with the stripped cyclohexanone-cyclohexanol. When desirable, any aqueous layer present in the storage chamber may be decanted and sent to the evaporator. The finished cyclohexanone-cyclohexanol containing the recovered adipic acid may be taken to the nitric acid oxidizer when needed.

The economical solvent recovery features of the process as shown should be noted. To the solvent recovery system 29 are returned the azeotropic dehydration distillation overhead (4.8 gm.), the filtration mother liquor (21 ml.), and the 2-nitropropane distilled from the adipic acid solution (19.7 gm.) in column 50. The non-volatile recoverable materials are removed from the solvent and either are burned or recovered if they are of value. The 2-nitropropane weighing 7.9 gm. is taken out and purified for reuse.

*Example II*

In a vessel equipped for vacuum distillation, there was placed 500 parts of a water extract obtained from a single stage countercurrent extraction of the oxidation product of cyclohexane obtained from the oxidizer in the above example. By analysis it was found that the water extract contained 75 parts adipic acid or adipic acid potential in esterfied form. The volume of the water extract was reduced to 190 parts by distilling off 310 parts at a temperature of 80° C. and under a pressure of 200 mm. of mercury. To the evaporated residue 90 parts of nitromethane was added. Fifteen parts of water was removed from the resulting mixture by subjecting same to a temperature of 90° C. and under a pressure of 200 mm. of mercury. The evaporated material in the vessel was cooled to 25° C. and allowed to stand until the adipic acid precipitated. It was determined that 63 parts of adipic acid was recovered; or in other words 83 percent of the adipic acid in the water extract was recovered.

*Example III*

In a manner similar to that of the next preceding example, nitroethane was used in the place of nitromethane. Sixty-two parts of adipic acid was recovered.

When Example II above is repeated with other of the defined solvents, similar results are obtained. For example nitromethane may be substituted by 1-nitropropane, chloroform, carbon tetrachloride, suitable solvent mixtures, and the like to obtain efficient recovery of adipic acid.

The process of this invention overcomes the serious and economic disadvantages of present processes for refining crude cyclohexanone-cyclohexanol by reducing the loss of potential adipic acid. Experiments and analyses of actual plant runs show that usual losses of 14–19 percent of adipic acid and potential adipic acid encountered in refining may be reduced to as little as 1 percent by the use of the adipic acid recovery method of this invention to upgrade the crude cyclohexanone-cyclohexanol and to increase the overall yield of adipic acid.

Another factor contributing to the success of the invention, and which further aids the amount of adipic acid recovered, is the hydrolysis of the esters of adipic acid present in the effluent. Hydrolysis is favorably influenced as indicated above and results in an increase of adipic acid recovered depending upon the amount of ester present in the effluent. Such an increase would not be possible if adipic acid were crystallized directly from the effluent in a dry state.

The amount of adipic acid present in the effluent varies with the percent conversion of the cyclohexane to cyclohexanone-cyclohexanol and adipic acid.

Because the crystallization of adipic acid occurs from a relatively high adipic acid concentration, relatively small sized equipment is needed for handling the adipic acid produced from cyclohexane oxidation. A further advantage of this inventive process is gained in the possibility of storing the aqueous extract, so that the crystallization from 2-nitropropane or like solvent can be shut down when necessary without loss of adipic acid or stoppage of the cyclohexanone and cyclohexanol production.

The extraction methods utilized in this invention are more easily controlled and have less mechanical difficulties than do continuous crystallization processes, and this is particularly true for the large flow rates encountered in adipic acid removal from cyclohexane oxidizer effluent. Aqueous extraction also increases the quality of crude cyclohexanone-cyclohexanol by removing some of the extraneous high boiling material, as well as the water soluble oxidation impurities. The thus purified cyclohexanone-cyclohexanol contains less succinic acid precursors. The increase in the quality of the crude cyclohexanone-cyclohexanol provided by the adipic acid recovery method of this invention may be sufficient to eliminate the need for the cyclohexanone-cyclohexanol refining operation.

Various modifications of the invention as described above will be apparent to those skilled in the art. Hence it will be understood that the invention is not limited to the foregoing description thereof except as it is defined in the appended claims.

What is claimed is:

1. A process for the removal and recovery of adipic acid and adipic acid esters in the form of adipic acid contained in the reaction product of the oxidation of cyclohexane into primarily cyclohexanone and cyclohexanol with a gas containing molecular oxygen comprising the steps of bringing said reaction product into intimate contact with water, whereby the adipic acid esters therein are hydrolyzed into adipic acid and whereby the thus produced adipic acid together with the free adipic acid is extracted from the reaction product, separating the aqueous extract containing the adipic acid from the organic phase containing primarily cyclohexanone, cyclohexanol, and cyclohexane, subjecting the separated aqueous extract to evaporating conditions for a sufficient time to reduce the water content thereof to less than 5 percent by weight, dissolving the evaporated extract in an organic solvent capable of forming a low boiling azeotrope with water, said solvent being selected from the group consisting of 2-nitropropane, 1-nitropropane, nitroethane, nitromethane, chloroform, and carbon tetrachloride, subjecting the resulting evaporated extract to azeotropic distillation conditions to further reduce the water content thereof, selectively precipitating the adipic acid from the residue of the azeotropic distillation by reducing the temperature thereof, and thereafter separating the precipitated adipic acid in crystalline form from the mother liquor.

2. A process for the removal and recovery of adipic acid and adipic acid esters in the form of adipic acid contained in the reaction product of the oxidation of cyclohexane into primarily cyclohexanone and cyclohexanol with a gas containing molecular oxygen comprising the steps of bringing said reaction product into intimate contact with water by a multi-stage counter-current continuous extraction, whereby the adipic acid esters therein are hydrolyzed into adipic acid and whereby the thus produced adipic acid together with the free adipic acid is extracted from the reaction product, said extraction involving at least two stages, separating the aqueous extract containing the adipic acid from the organic phase containing primarily cyclohexanone, cyclohexanol and cyclohexane, subjecting the separated aqueous extract to a reduced pressure of 100–400 mm. of mercury and a temperature of less than 90° C. for a sufficient time to reduce the water content thereof to less than 5 percent by weight, dissolving the evaporated extract in an organic solvent capable of forming a low boiling azeotrope with water, said solvent being selected from the group consisting of 2-nitropropane, 1-nitropropane, nitroethane, nitromethane, chloroform, and carbon tetrachloride, subjecting the resulting evaporated extract to azeotropic distillation conditions of a pressure of 100–760 mm. of mercury and at a temperature below 100° C. to further reduce the water content thereof to less than 3 percent by weight, selectively precipitating the adipic acid from the residue of the azeotropic distillation by reducing the temperature thereof, and thereafter separating the precipitated adipic acid in crystalline form from the mother liquor.

3. The process of claim 2 wherein the precipitating of the adipic acid is carried out at 30–40° C.

4. The process of claim 2 wherein the organic solvent is nitromethane.

5. The process of claim 2 wherein the organic solvent is 2-nitropropane.

6. The process of claim 2 wherein the solvent is chloroform.

7. The process of claim 2 wherein the solvent is carbon tetrachloride.

References Cited in the file of this patent
UNITED STATES PATENTS 2,675,407    Gallo et al. _____ Apr. 13, 1954
2,870,203    Cyphers et al. _____ Jan. 20, 1959